(No Model.)

C. WINCKLHOFER.
AUTOMATIC DOOR CLOSING DEVICE.

No. 525,830. Patented Sept. 11, 1894.

Attest:
William Ratson.
John Sherman

Inventor.
Charles Wincklhofer, Jr.
Henry J. Miller, Atty.

UNITED STATES PATENT OFFICE.

CHARLES WINCKLHOFER, OF NEWARK, NEW JERSEY.

AUTOMATIC DOOR-CLOSING DEVICE.

SPECIFICATION forming part of Letters Patent No. 525,830, dated September 11, 1894.

Application filed March 31, 1894. Serial No. 505,828. (No model.)

*To all whom it may concern:*

Be it known that I, CHARLES WINCKLHOFER, a citizen of the United States, residing in Newark, Essex county, New Jersey, have invented certain new and useful Improvements in Automatic Door-Closing Devices, fully described and represented in the following specification and the accompanying drawings, forming a part of the same.

This invention relates to that class of automatic door closing devices in which an air cushion offers a yielding resistance to the impulse of the actuating spring; and the invention consists in the mechanism herein shown and described for actuating the piston of the air cylinder by means of a rotary spindle at one end of the latter.

The invention will be understood by reference to the annexed drawings, in which—

Figure 1:
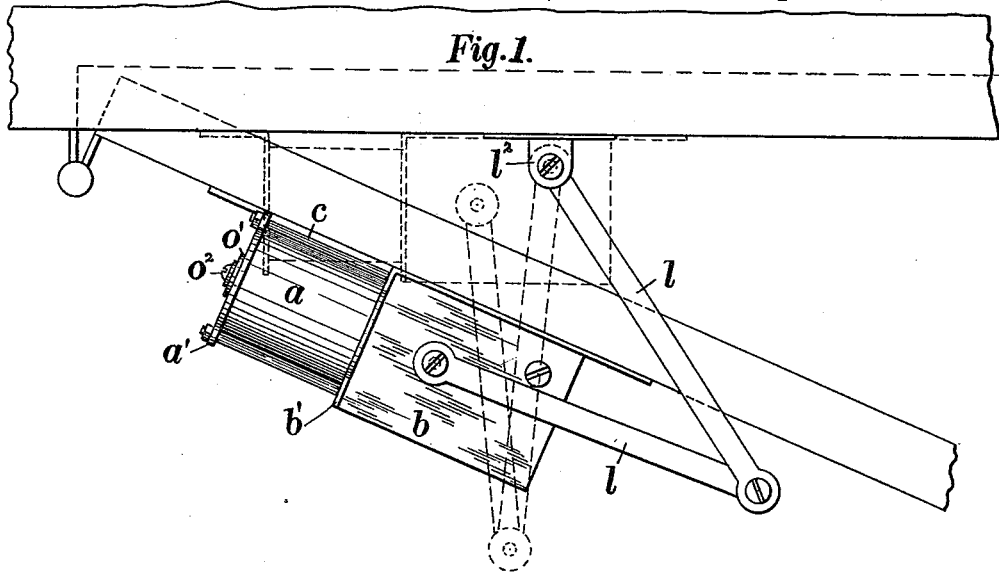
Figure 2:
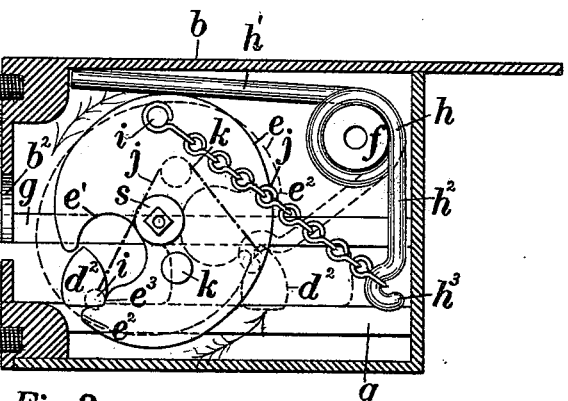
Figure 3:
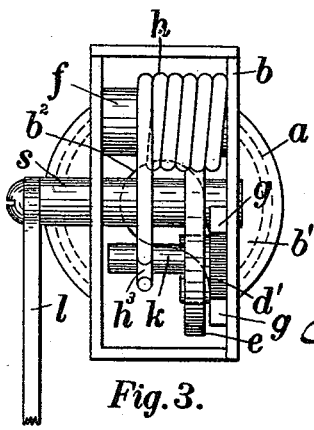

Figure 1 is a plan of a door casing and a door partly open provided with my improvement, the door being shown also closed in dotted lines. Fig. 2 is a plan of the device detached and upon a larger scale, with the casing and air cylinder in section upon the center line of the latter; and Fig. 3 is an end elevation of the same with the nearer end removed to expose the contents.

The air cylinder $a$ is shown herein formed of a straight cylindrical shell secured to a suitable flange $b'$ upon the adjacent end of the casing $b$ by means of bolts $c$ passing through the cylinder head $a'$. The piston $d$ is provided with an eccentric piston rod $d'$ with its outer end projected within the casing through the aperture $b^2$ and fitted to suitable guides $g$. A spindle $s$ is shown applied to the casing transverse to the center line of the air cylinder adjacent to the piston rod $d'$, which carries a disk cam $e$ with recess $e'$ and adjacent hook $e^2$ and adaped to engage the heart-shaped lateral stud $d^2$ upon the piston rod, and into the recess of which cam the said stud is normally projected as shown in Fig. 2. A stud $f$ is formed within the casing adjacent to the cam, to which is applied the spiral spring $h$ terminated at one end by the arm $h'$ projected against the side of the casing and thus fixed in its position, and at the other end in a freely movable arm $h^2$ having the hook $h^3$ formed at its outer end. A stud $k$ is formed upon the cam $e$ adjacent to the recess $e'$; and a pin $i$ is also formed thereon nearly opposite the same relative to the spindle, to which is connected one end of the chain $j$ having its other end attached to the hook $h^3$. The cam is provided at one side of the recess $e'$ and adjacent to its hook $e^2$ with a shoulder $e^3$ shown in Fig. 2 in engagement with one corner of the stud $d^2$ and serving as a stop for the cam in conjunction with the stud.

The cylinder head $a'$ is provided in the usual manner with a suitable vent; shown herein comprising an aperture $o$ covered by one side of a yielding disk $o'$ of leather or other suitable material clamped thereon by means of a screw $o^2$ and a washer. In addition to such continuous vent, longitudinal grooves $t$ are formed in the inner periphery of the cylinder adjacent to such head and extended for a short distance along the cylinder toward the opposite end.

The device is shown in Fig. 1 applied to the door with a lever $l$ affixed to one end of the spindle which is projected without the casing for the purpose, to which lever is pivoted one end of the link $l'$ having its opposite end pivoted to a suitable foot piece $l^2$ secured to the door casing.

The operation of the device is as follows:— When the door is in its closed position, the lever $l$ assumes the position shown in dotted lines in Fig. 1, the shoulder $e^3$ of the cam $e$ resting against the contiguous corner of the stud $d^2$ and the piston remaining in its normal position as indicated in full lines in Fig. 2; but as the door is opened, the lever $l$ is turned in the direction indicated in Fig. 1 in full lines, thus actuating the cam in the direction indicated by the arrows to withdraw the piston $d$, by the engagement of such cam with the stud $d^2$ as indicated in the dotted lines in Fig. 2. Such partial rotation of the cam carries the pin $i$ and stud $k$ to opposite sides of the spindle with relation to the hook $h^3$ of the spring $h$, whereby the chain $j$ is bent around the stud $k$ which maintains the leverage of the spring pressure as well as its direction in the tendency to return the disk cam to its initial position. The release of the door permits the spring to rotate the cam in the reverse direction to that indicated by the arrows in Fig. 2 until its hook $e^2$ engages the stud $d^2$, when the piston is thereby thrust against the air cushion formed in the outer end of the cylinder which operates to retard its movement as it nears the outer end of its stroke until it passes over the grooves $t$; when the confined air instantly rushes through such grooves into the space behind the piston and the resistance is thereby removed. Such instantaneous release of the air cushion removes wholly the resistance to the movement of the piston, and the remainder of its stroke is traversed under the full force of the spring $h$ by means of the cam $e$ and stud $d^2$ upon the piston rod.

From the above description of the operation of the device, it will be observed that the length of the grooves $t$, the shape of the cam $e$ and the studs $d^2$, and the location of the pin $i$ and stud $k$ may be varied at will to suit the requirements of the device for any given position or conditions without departing from my invention, such matters being merely of adjustment and not therefore material to the principles involved in my improvement; the essential feature of which is the spindle operated by a lever and connected with the piston to actuate the same, combined with a suitable spring for retaining such members in their normal position.

Having thus set forth my invention, what I claim herein is—

1. In an automatic door closing device, the combination, with an air cylinder and a piston fitted thereto having a piston rod provided with a lateral stud, of a spindle arranged at one end of the cylinder adjacent to the piston rod with a cam mounted thereon adapted to engage the said lateral stud, a spring connected to the cam and adapted to retain the same in its normal position, and a lever upon the spindle for turning the same in opposition to the spring, substantially as herein set forth.

2. In an automatic door closing device, the combination, with an air cylinder and a piston fitted thereto having a piston rod provided with a lateral stud, of a spindle arranged at one end of the cylinder adjacent to the piston rod with a cam mounted thereon adapted to engage the said lateral stud, a spring fixed adjacent to the said cam and connected to a suitable pin upon the same, and a lever for turning the spindle and cam in opposition to the spring, substantially as herein set forth.

3. In an automatic door closing device, the combination, with a suitable casing, an air cylinder, and a piston with its rod projected within the said casing and provided with a lateral stud, of a spindle mounted in the casing adjacent to the piston rod and carrying a cam adapted to engage the stud upon the piston rod, a fixed stud within the casing adjacent to the cam, a spring encircling the stud with one end fixed and the other end terminating in a freely movable arm, a pin upon the said cam, a chain for connecting the movable arm of the spring with such pin, and a lever applied to the spindle without the casing for turning the same, substantially as shown and described.

4. In an automatic door closing device, the combination, with a suitable casing, an air cylinder, and a piston with its rod projected within the said casing and provided with a lateral stud, of a spindle mounted in the casing adjacent to the piston rod and carrying a cam adapted to engage the stud upon the piston rod, a fixed stud within the casing adjacent to the cam, a spring encircling the stud with one end fixed and the other end terminating in a freely movable arm, a pin upon the said cam at its periphery, a stud projected from the cam opposite to its peripheral pin, a chain for connecting the movable arm of the spring with the said pin, and a lever applied to the spindle without the casing for turning the same, as and for the purpose set forth.

In testimony whereof I have hereunto set my hand in the presence of two subscribing witnesses.

CHARLES WINCKLHOFER.

Witnesses:
HENRY J. MILLER,
WILLIAM BATSON.